US008214081B2

(12) United States Patent
Choi et al.

(10) Patent No.: US 8,214,081 B2
(45) Date of Patent: Jul. 3, 2012

(54) MULTI-FUNCTION ROBOT FOR MOVING ON WALL USING INDOOR GLOBAL POSITIONING SYSTEM

(75) Inventors: Doo-jin Choi, Daejeon (KR); Seong-jong Han, Seoul (KR); Yun-Seo Choi, Seoul (KR); Young-jun Park, Daejeon (KR); Jae-hoon Kim, Daejeon (KR)

(73) Assignee: Samsung Heavy Ind. Co., Ltd. (KR)

( * ) Notice: Subject to any disclaimer, the term of this patent is extended or adjusted under 35 U.S.C. 154(b) by 590 days.

(21) Appl. No.: 12/442,692

(22) PCT Filed: Sep. 21, 2007

(86) PCT No.: PCT/KR2007/004640
§ 371 (c)(1),
(2), (4) Date: Mar. 24, 2009

(87) PCT Pub. No.: WO2008/038960
PCT Pub. Date: Apr. 3, 2008

(65) Prior Publication Data
US 2010/0030378 A1  Feb. 4, 2010

(30) Foreign Application Priority Data

Sep. 29, 2006  (KR) .................. 10-2006-0095902

(51) Int. Cl.
*G05B 19/18* (2006.01)
(52) U.S. Cl. ............ 700/250; 700/253; 700/257; 901/1; 901/42
(58) Field of Classification Search .................. None
See application file for complete search history.

(56) References Cited

U.S. PATENT DOCUMENTS
4,821,192 A  4/1989  Taivalkoski et al.
(Continued)

FOREIGN PATENT DOCUMENTS
CN  1788945  6/2006
(Continued)

OTHER PUBLICATIONS

Climbing robot localisation_Hillenbrand.pdf (C. Hillenbrand., K. Berns, A Sensor System for the Localisation of Climbing Robots, Fourth International Workshop on Robot Motion and Control, Jun. 17-20, 2004, pp. 109-114).*

(Continued)

*Primary Examiner* — Khoi Tran
*Assistant Examiner* — Bao Long T Nguyen
(74) *Attorney, Agent, or Firm* — Harness, Dickey & Pierce, P.L.C.

(57) ABSTRACT

A wall climbing robot using an Indoor Global Positioning System (IGPS) provided in a room is disclosed. The wall climbing robot includes a navigation receiver configured to receive rotating fan beams emitted from one or more navigation transmitters of the indoor global positioning system, and recognize the rotating fan beams as IGPS signals; a robot frame provided with the navigation receiver mounted; a mobile controller configured to be installed on the robot frame, and to recognize and determine its own position using the IGPS signals; and a drive mechanism configured to travel along the surfaces of the room under control of the mobile controller. The mobile controller includes a central processing unit, an input/output unit, a motion control unit, a drive control unit, a navigation control unit, a sensor signal processor, an emergency processing unit, and an alarm generator.

16 Claims, 8 Drawing Sheets

U.S. PATENT DOCUMENTS

| | | | | |
|---|---|---|---|---|
| RE34,597 | E | * 5/1994 | Akeel | 219/121.78 |
| 5,809,099 | A | * 9/1998 | Kim et al. | 376/249 |
| 6,491,612 | B1 | * 12/2002 | Kurup et al. | 483/16 |
| 6,501,543 | B2 | 12/2002 | Hedges et al. | |
| 8,019,472 | B2 | * 9/2011 | Montero SanJuan et al. | 700/245 |
| 2003/0208302 | A1 | * 11/2003 | Lemelson et al. | 700/245 |
| 2005/0209736 | A1 | 9/2005 | Kawagoe | |
| 2006/0136097 | A1 | 6/2006 | Kim et al. | |
| 2008/0009969 | A1 | * 1/2008 | Bruemmer et al. | 700/245 |

FOREIGN PATENT DOCUMENTS

| | | |
|---|---|---|
| EP | 0 461 506 | 12/1994 |
| JP | H02-311907 | 12/1990 |
| JP | 03-213279 A | 9/1991 |
| JP | 06-035534 A | 2/1994 |
| JP | H09-021788 | 1/1997 |
| JP | H11-079019 | 3/1999 |
| JP | 2000-330639 A | 11/2000 |
| JP | 2003-233423 | 8/2003 |
| JP | 2003-300186 A | 10/2003 |
| JP | 2004-226267 | 8/2004 |
| JP | 2005-346700 | 12/2005 |
| KR | 10-2002-0088880 A | 11/2002 |
| KR | 10-2004-0059615 A | 7/2004 |
| KR | 10-2005-0016786 A | 2/2005 |
| WO | 03/019231 | 3/2003 |

OTHER PUBLICATIONS

Nishi A et al., "Mechanism and Control of Propeller Type Wall-Climbing Robot", Intelligent Robots and Systems '94. 'Advanced Robotic Systems and the Real World', IROS '94. Proceedings of the IEEE/RSJ/GI International Conference in Munich, Germany, Sep. 12-16, 1994.

The extended European search report dated Nov. 11, 2010.

The Chinese Office Action dated Jun. 10, 2010 and English translation thereof.

The Japanese Office Action dated Aug. 23, 2011.

The European Official Communication dated Sep. 7, 2011.

* cited by examiner

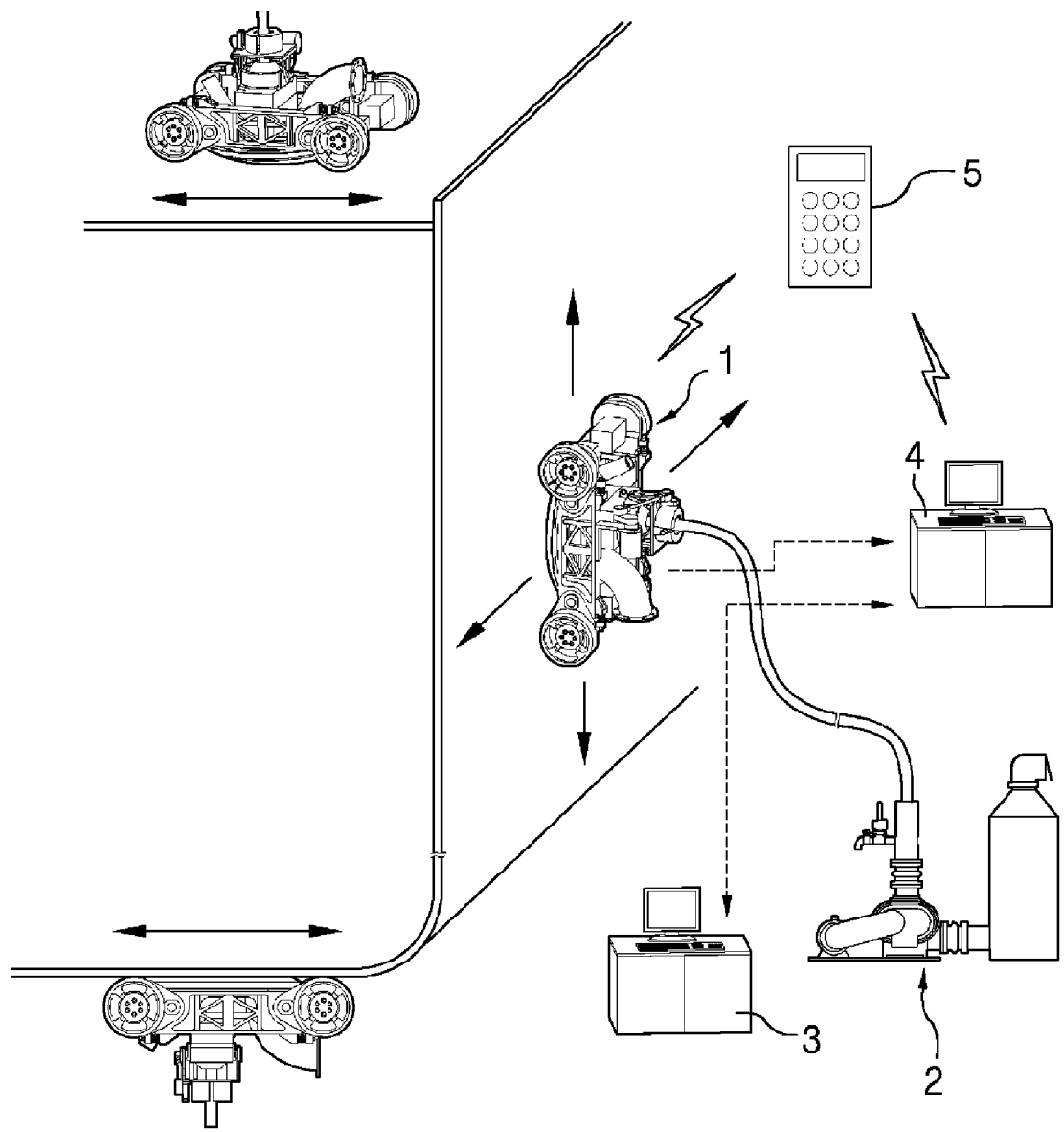
[Fig. 1]

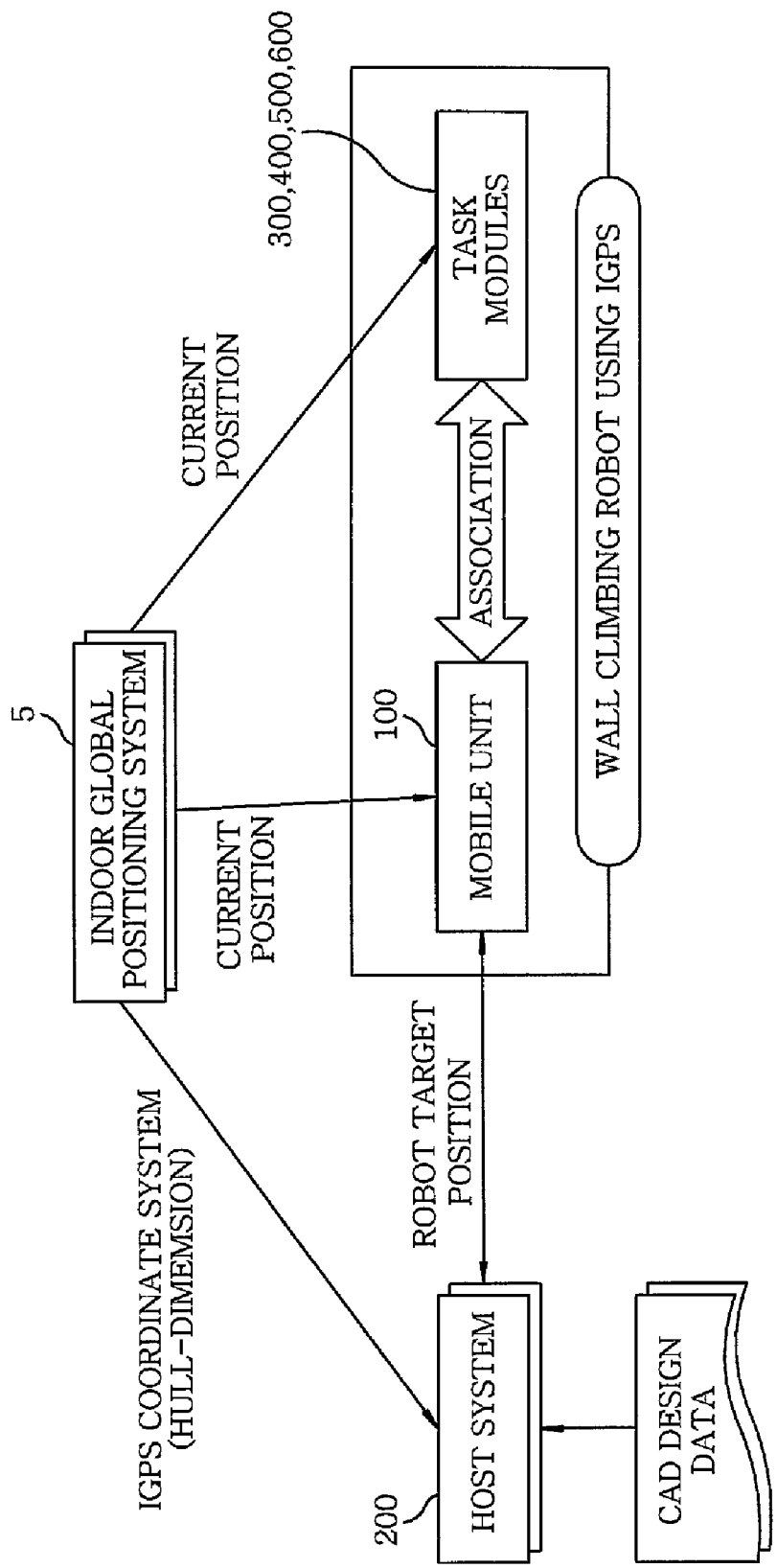
[Fig. 2]

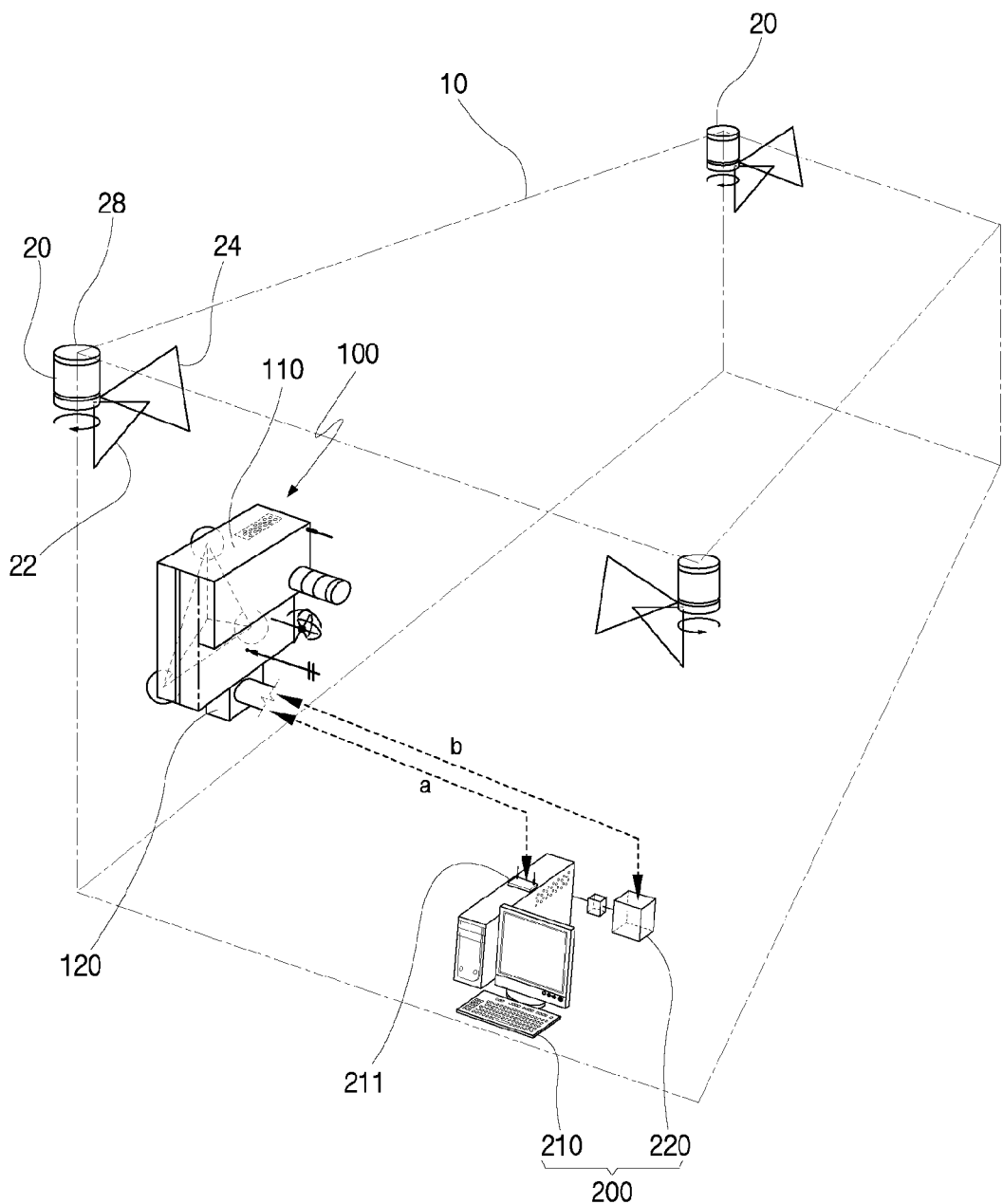
[Fig. 3]

[Fig. 4]
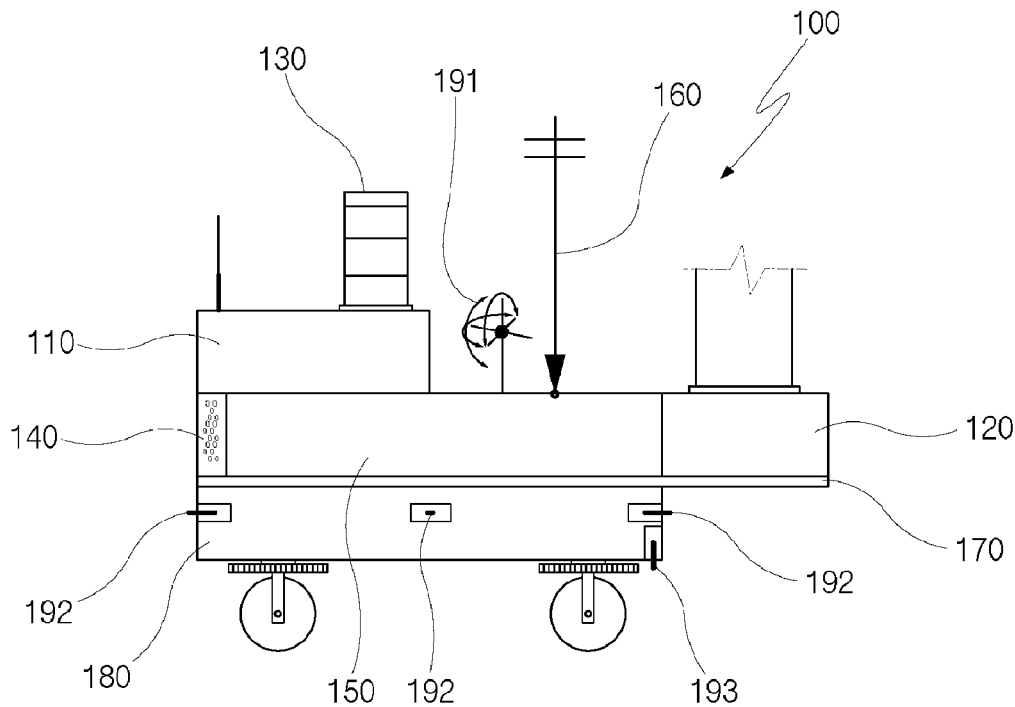
[Fig. 5]
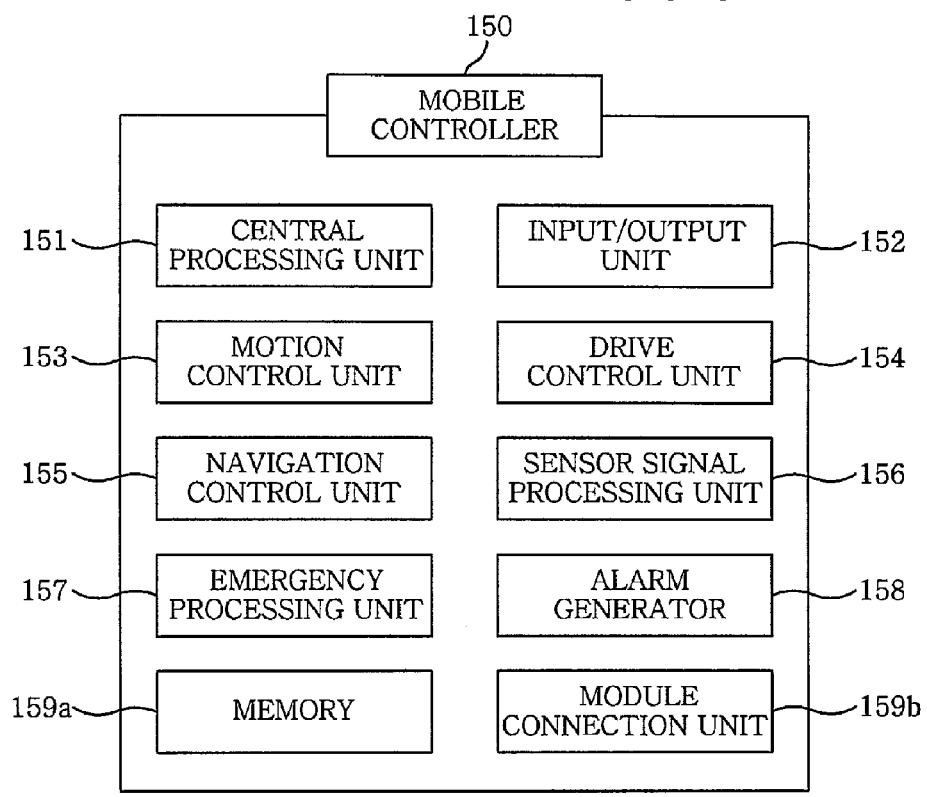

[Fig. 6]
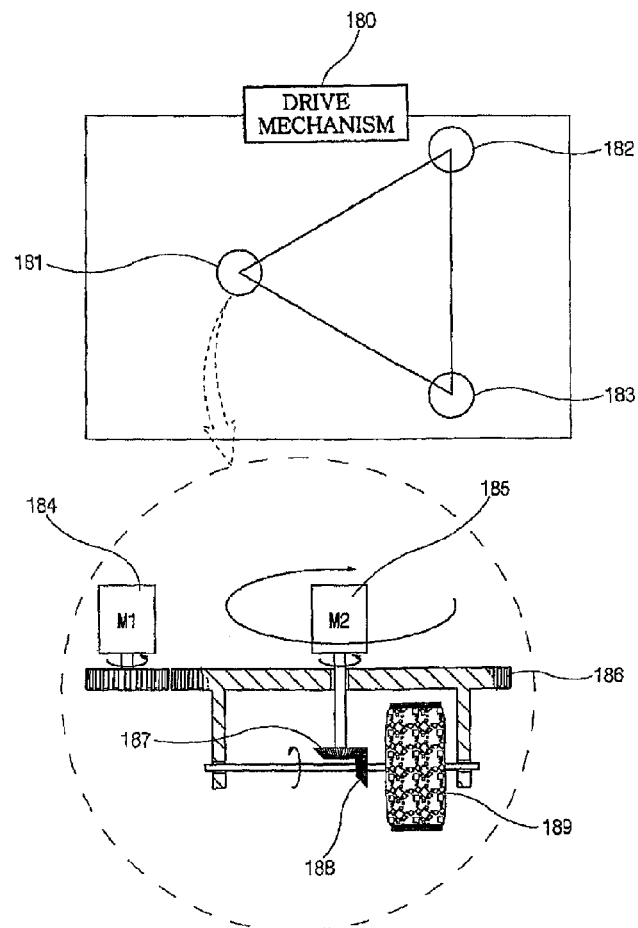
[Fig. 7]
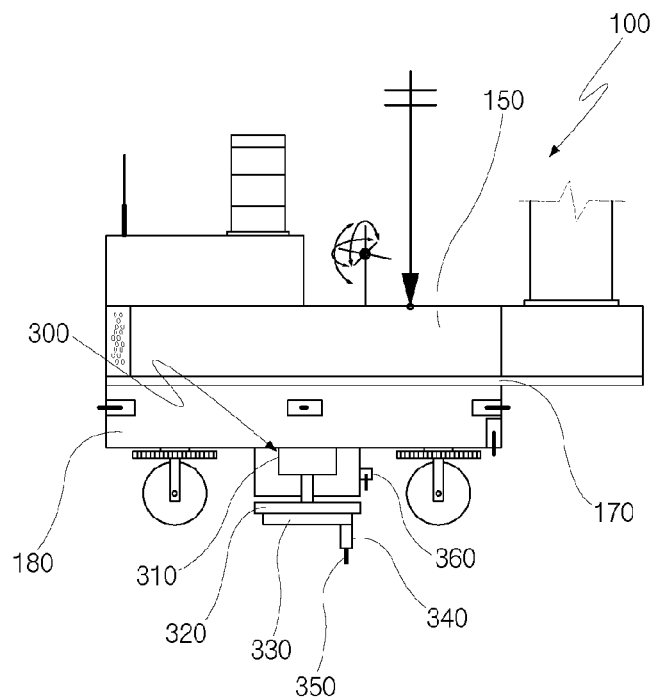

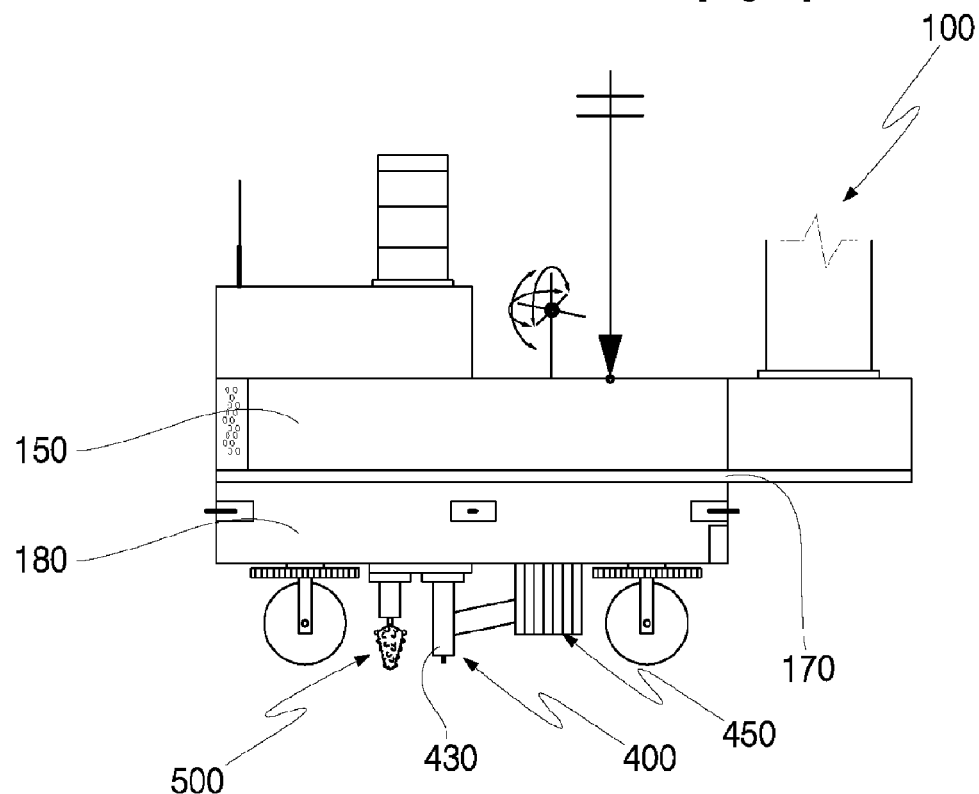
[Fig. 8]
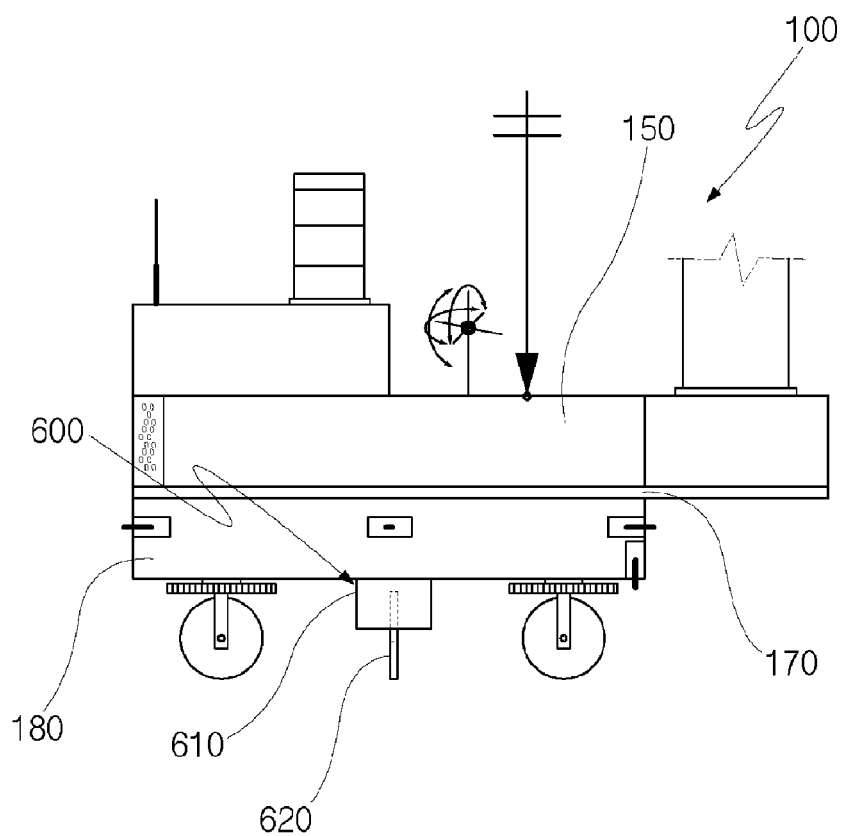
[Fig. 9]

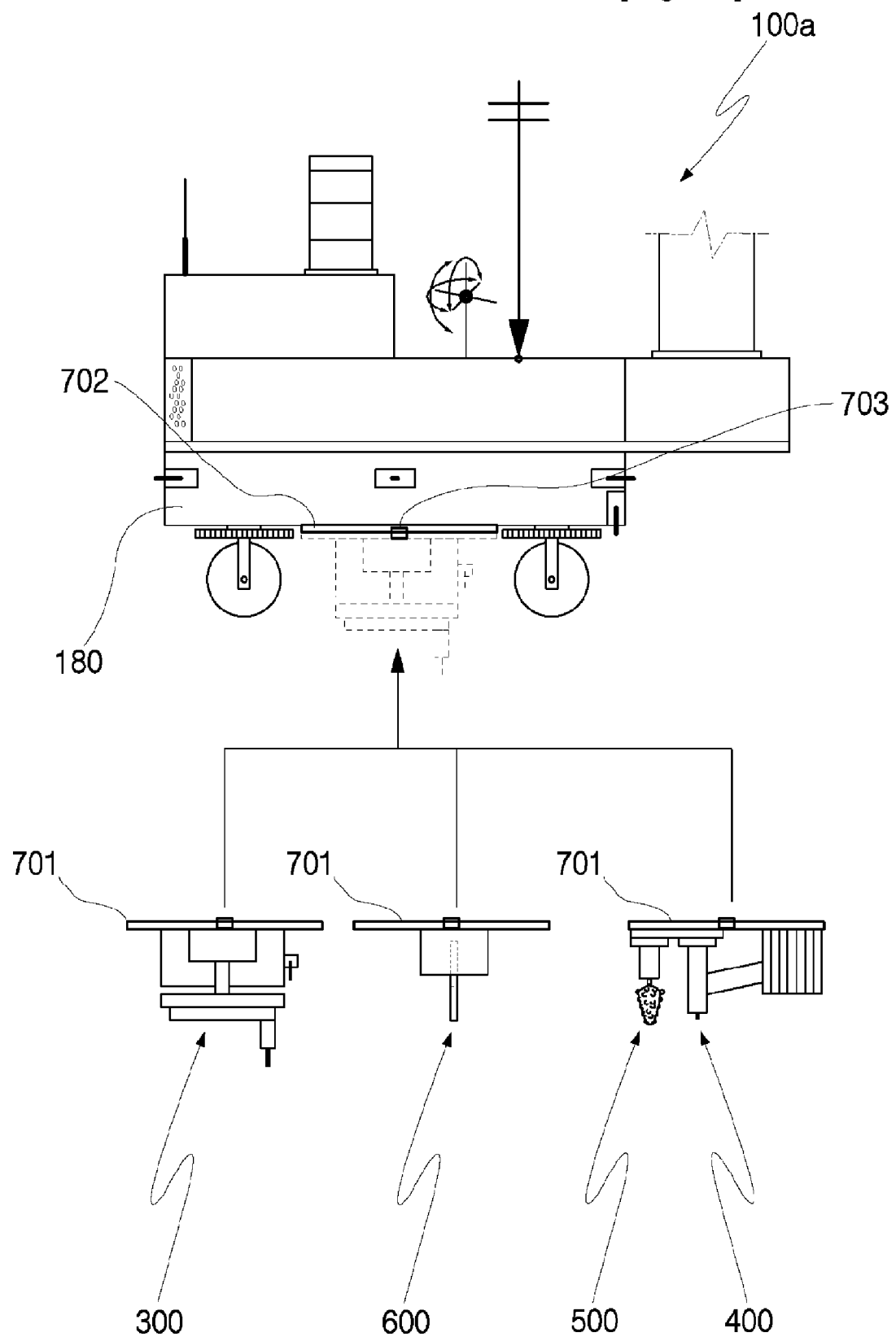
[Fig. 10]

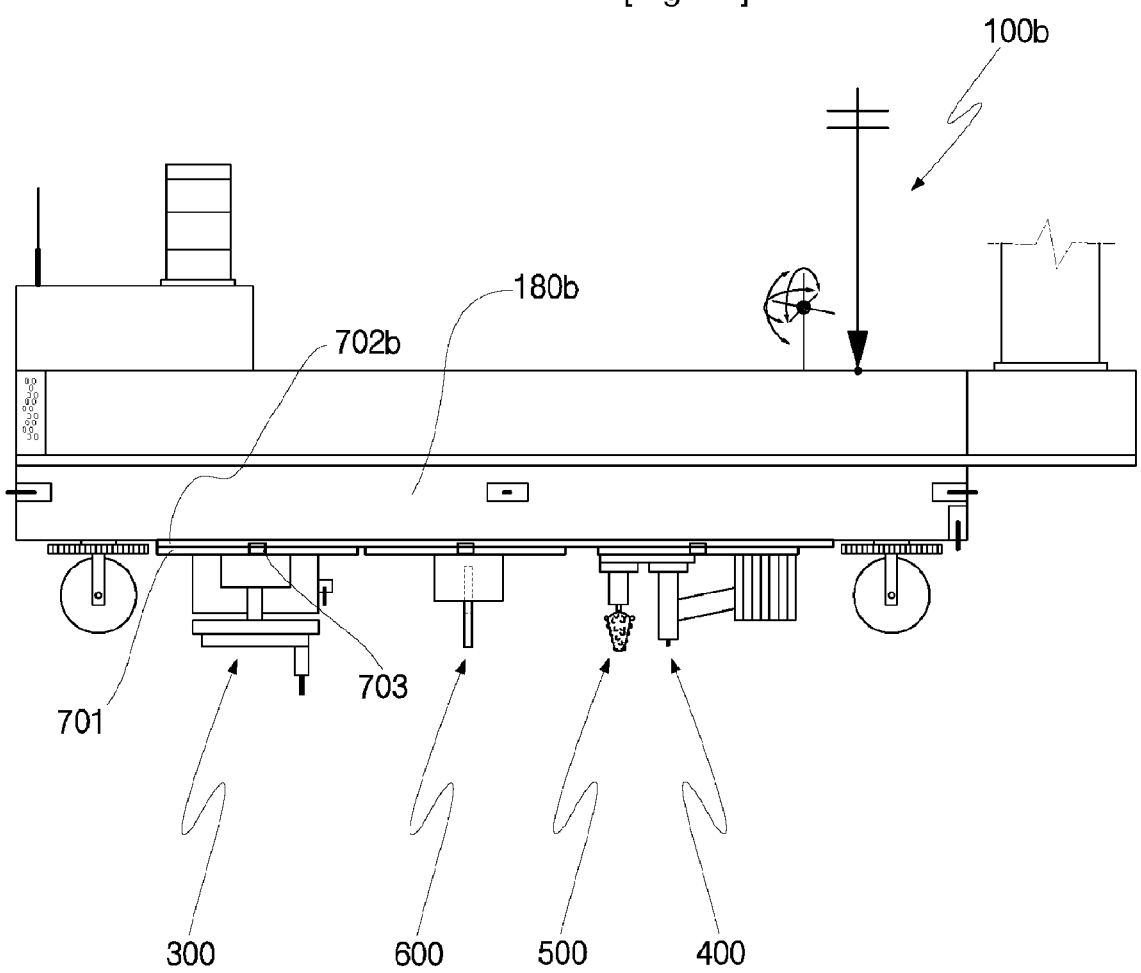
[Fig. 11]

MULTI-FUNCTION ROBOT FOR MOVING ON WALL USING INDOOR GLOBAL POSITIONING SYSTEM

TECHNICAL FIELD

The present invention relates to a wall climbing robot that uses an indoor global positioning system.

BACKGROUND ART

Generally, a Global Positioning System (GPS) is a device for recognizing and determining three-dimensional coordinate values (hereinafter referred to as "coordinate values") corresponding to the position of a GPS receiver using three or more GPS satellites.

This concept is applied to an Indoor Global Positioning System (IGPS). U.S. Pat. No. 6,501,543 discloses information using this concept.

U.S. Pat. No. 6,501,543 discloses transmitters corresponding to the above-described GPS satellites, and a receiver corresponding to the GPS receiver.

Each of the transmitters emits two rotating fan beams. The rotating fan beams may be laser fan beams or another type of light emission medium.

Hereinafter, IGPS means a localized indoor positioning system, which includes transmitters corresponding to GPS satellites and a receiver corresponding to a GPS receiver.

The receiver receives rotating fan beams emitted from the transmitters, and determines positions relative to the transmitters. Here, since the rotating fan beams cross each other at predetermined angles, the coordinate values of the receiver for receiving the rotating fan beams, that is, the position or altitude thereof, can be measured.

Meanwhile, the basic concept of existing autonomous mobile robots is to travel on flat surfaces, that is, horizontal flat surfaces, using self-generated information or real-time positioning information transmitted through communication In particular, one core element of such conventional autonomous mobile robots is a drive mechanism, and the drive mechanism includes chain, wheel, and multilegged-type drive mechanisms.

Meanwhile, spider robots or attachment robots are robots which overcome the limitations of the flat-surface mobile robots and travel on ceilings or vertical surfaces.

The conventional ceiling-surface/vertical-surface mobile robots cannot travel autonomously, as compared with general flat-surface mobile robot, and are semi-autonomous mobile robots which must ride on fixed rails or be remotely controlled by a person.

In particular, such equipment using rails has limitations on the traveling range or operational area, and cannot be used in practice in an unsuitable installation space or a place where frames, such as rails, cannot be easily attached.

For example, as shown in FIG. 1, a conventional surface attachment mobile robot 1 includes a vacuum generator 2 located on the ground so as to form a vacuum space for realizing attachment to the surface of a wall; an auxiliary controller 3 for controlling the vacuum generator 2; a main controller 4 for controlling the surface attachment mobile robot 1; and a wireless controller 5 capable of being attached/detached to/from the main controller 4, driving motors and the vacuum generator 2, and controlling the surface attachment mobile robot 1. The conventional surface attachment mobile robot 1 is a semi-autonomous mobile robot which always requires the wireless controller 5.

Further, since the conventional surface attachment mobile robot 1 has a bi-directional wheel structure, it has a disadvantage in that it cannot freely travel on the inside surface of a cargo hold.

Furthermore, there are no ceiling surface/vertical surface-dedicated autonomous mobile robots which recognize their own positions and reach destinations.

DISCLOSURE OF INVENTION

Technical Problem

Accordingly, the present invention has been made keeping in mind the above problems occurring in the prior art, and an object of the present invention is to provide a wall climbing robot using an indoor global positioning system, which can autonomously travel along the ceiling surface or vertical surfaces of the inside of a cargo hold or a tank using the IGPS signals of the indoor global positioning system.

Technical Solution

In order to accomplish the above object, the present invention provides a wall climbing robot using an Indoor Global Positioning System (IGPS) provided in a room, including a navigation receiver configured to receive rotating fan beams emitted from one or more navigation transmitters of the indoor global positioning system, and recognize the rotating fan beams as IGPS signals; a robot frame to which the navigation receiver is mounted; a mobile controller configured to be installed on the robot frame, and to recognize and determine its own position using the IGPS signals; and a drive mechanism configured to travel along the surfaces of the room under control of the mobile controller.

According to the present invention, the wall climbing robot further includes a marking module coupled to a mobile unit in which the mobile controller is installed, and configured to perform a marking operation.

According to the present invention, the wall climbing robot further includes a stud bolt welding module coupled to a mobile unit in which the mobile controller is installed, and configured to perform an operation of welding a stud bolt.

According to the present invention, a grinder module is further coupled to the mobile unit at an installation position where a preliminary grinding operation is performed with respect to the stud bolt welding module.

According to the present invention, the wall climbing robot further includes a depth measuring module coupled to a mobile unit in which the mobile controller is installed, and configured to perform a depth measurement operation.

According to the present invention, a plurality of first and second clamp units and a plurality of fastening elements are provided to a bottom of the drive mechanism so as to replace or simultaneously mount task modules.

Advantageous Effects

The wall climbing robot using an indoor global positioning system according to the present invention includes a navigation receiver which recognizes rotating fan beams, emitted from navigation transmitters of the indoor global positioning system, as IGPS signals, it has an advantage in that it is possible for the robot to recognize and determine the current position thereof, and to autonomously travel or move to a target position.

Further, the wall climbing robot using an indoor global positioning system according to the present invention has an advantage in that it can more exactly and precisely perform traveling motion, compared to existing robots which depend only on encoder signals.

Furthermore, since the wall climbing robot using an indoor global positioning system according to the present invention includes a marking module, a stud bolt welding module, a grinder module, and a depth measuring module, or further includes an integrated module in which the respective modules are integrated, it has an advantage in that it can perform all of a marking operation, a welding operation, a preliminary grinding operation, and a depth measuring operation.

BRIEF DESCRIPTION OF THE DRAWINGS

FIG. 1 is a diagram showing the surface attachment mobile robot;

FIG. 2 is a diagram showing the configuration of a system for a wall climbing robot using an indoor global positioning system according to an embodiment of the present invention;

FIG. 3 is a view showing the working state of the robot shown in FIG. 2;

FIG. 4 is a block diagram showing the configuration of the robot shown in FIG. 3;

FIG. 5 is a block diagram showing the mobile controller shown in FIG. 4;

FIG. 6 is a block diagram having an enlarged cross-sectional view for showing the drive mechanism shown in FIG. 4;

FIG. 7 is a block diagram showing a marking module coupled to the wall climbing robot using an indoor global positioning system according to the present invention;

FIG. 8 is a block diagram showing a stud bolt welding module and a grinder module coupled to the wall climbing robot using an indoor global positioning system according to the present invention;

FIG. 9 is a block diagram showing a depth measuring module coupled to the wall climbing robot using an indoor global positioning system according to the present invention;

FIG. 10 is a view showing an example of the application of the wall climbing robot using an indoor global positioning system according to the present invention; and FIG. 11 is a view showing another example of the application of the wall climbing robot using an indoor global positioning system according to the present invention.

BEST MODE FOR CARRYING OUT THE INVENTION

The present invention will be described in detail with reference to the attached drawings below through descriptions of preferred embodiments. The same reference numerals used throughout the different drawings designate the same components.

FIG. 2 is a diagram showing the configuration of a system for a wall climbing robot using an indoor global positioning system according to an embodiment of the present invention.

As shown in FIG. 2, with regard to the input/output of the system for the robot according to the present invention, an indoor global positioning system 5 supplies information about an IGPS coordinate system for hull dimensions to a host system 200. Further, the indoor global positioning system 5 can transmit information about a current position to a mobile unit 100 or task modules 300, 400, 500, and 600.

The task modules 300, 400, 500, and 600, which will be described in detail later, are a marking module 300, a stud bolt welding module 400, a grinder module 500, and a depth measuring module 600.

The host system 200 receives the Computer-Aided Design (CAD) design data of a hull, cargo hold design data, or the CAD design data of a specific space, which are separately input from the outside, determines the target position of a robot based on the data, and transmits information about the determined target position of the robot to the mobile unit 100.

The wall climbing robot using an indoor global positioning system according to the present invention applies the coordinate values of a current position, transmitted from the indoor global positioning system 5 in real time, to the information about the target position of the robot, which is digital map information transmitted from the host system 200, so that the wall climbing robot can travel to the target position.

Referring to a diagram showing the working state of a robot illustrated in FIG. 3, the size of a room 10 can be obtained by mounting well-known laser measurement devices and a laser receiver in corner portions of the room 10, and repeatedly measuring the lengths of the diagonals or edges of respective surfaces based on the corner portions.

Thereafter, the coordinate values of the respective corner portions or reference positions are converted into global coordinate values or coordinate values of the IGPS coordinate system for the hull dimensions, thereby completing digital map information based on the actual measurement of the corresponding room 10.

The digital map information completed as described above or the CAD design data about the room 10, which is separately input from the outside, are recorded, stored, and managed by a central host computer 210, are transmitted to the wall climbing robot using an indoor global positioning system according to the present invention, which will be described later, via a wired or wireless communication method, and are used for the navigation of the robot.

Meanwhile, according to the present invention, more accurately and precisely completed digital map information can be stored and used in the central host computer 210 using a method of installing a separate length measurement transmitter (not shown) for transmitting IGPS signals and a plurality of length measurement receivers (not shown) for receiving the IGPS signals so as to measure the size of the room 10 in the room 10, measuring the positions of respective vertexes of the inside of the room 10 using the length measurement receivers, three-dimensionally realizing the room 10 based on the measured positions of the respective vertexes, and measuring the size of the room 10 (using a trigonometrical function).

The present invention relates to a wall climbing robot using an indoor global positioning system, which receives IGPS signals and autonomously travels.

For this purpose, the present invention employs a plurality of navigation transmitters 20, such as the IGPS installed in the room 10.

Each of the navigation transmitters 20 emits two rotating fan beams 22 and 24, and includes a variable magnet 28 capable of being attached/detached to/from one end of the housing of the navigation transmitter 20 such that the navigation transmitter 20 can be temporarily attached to the flat portion of a membrane, which is the surface of the room 10. The variable magnet 28 is configured such that the generation or offset of the magnetic action of the variable magnet 28 can be controlled by switching a lever.

It is preferable that the navigation transmitter 20 be installed at the corresponding position in the room 10 using the variable magnet 28.

Here, the installation position of the navigation transmitter 20 is the same as the position indicated by the coordinate values input to the central host computer 210 in advance.

The host system 200 according to the present invention can upgrade auxiliary data for the brain-mounted mobile unit 100, unlike the existing network type or remote control type.

The host system 200 includes a central host computer 210 having digital map information in which the space inside the room 10 is three-dimensionally coordinated; and an attachment force generator 220 for supplying a surface attachment medium "b" which corresponds to vacuum force for a plurality of vacuum pads (not shown) or electromagnetic force for a plurality of magnetic wheels, for the traveling motion of the mobile unit 100 according to the method of the drive mechanism of the mobile unit 100, that is, a vacuum method or a magnetic method.

The central host computer 210 includes a wired or wireless first communication unit 211 capable of communicating with the mobile unit 100.

First, the CAD design data, which is digital map information, is input to the central host computer 210 of the host system 200.

The central host computer 210 transmits the CAD design data, which is at least digital map information, to the mobile unit 100 using the first communication unit 211, and receives position change checking information from the mobile unit 100. That is, the central host computer 210 performs bi-directional communication with the mobile unit 100 by transmitting/receiving data information "a" and can update the mobile unit 100.

Further, the central host computer 210 is connected to the attachment force generator 220 through an attachment force generator controller (not shown) so as to control the power supplying circuit (not shown) or the aspirator (not shown) of the attachment force generator 220.

In such a central host computer 210 are provided with an attachment force generator driver and application programs for controlling the attachment force generator controller in the form of software.

Here, the attachment force generator driver and the application program adjust the amount of supply of the surface attachment medium "b" such as electromagnetic force, so as to realize the traveling motion of the mobile unit 100, for example, the motion of driving the mobile unit 100 with the magnetic wheels thereof attached to a flat portion.

Further, the central host computer 210 can display the current motion or working state of a robot on the monitor screen of the central host computer 210 using position change checking information transmitted from the mobile unit 100.

For this purpose, the position change checking information preferably includes position information values (coordinate values) recognized and determined based on at least the motion of the robot.

Meanwhile, the mobile unit 100 includes a second communication unit 110 capable of performing mutual identification and data communication with the first communication unit 211 of the host system 200. The first communication unit 211 and the second communication unit 110 support well-known wired or wireless data communication interfaces, thereby having compatible structures.

The mobile unit 100 includes a supply connection unit 120 based on a technical standard corresponding to a specific connection pipe or connection line so as to receive the surface attachment medium "b" supplied from the attachment force generator 220. Here, although the supply connection unit 120 is not shown in detail in the drawing, the supply connection unit 120 is configured to supply the surface attachment medium "b" toward the vacuum pads or the magnetic wheels.

FIG. 4 is a schematic diagram showing the configuration of the robot shown in FIG. 3.

As shown in FIG. 4, besides the above-described second communication unit 110 and supply connection unit 120, the mobile unit 100 further includes a light-emitting alarm unit 130, an alerting alarm unit 140, a mobile controller 150, corresponding to the brains of the robot, a navigation receiver 160, a robot frame 170, and a drive mechanism 180.

The light-emitting alarm unit 130 and the alerting alarm unit 140 are mounted around the second communication unit 110 or on the robot frame 170, and are connected to the mobile controller 150, which will be described later.

The light-emitting alarm unit 130 and the alerting alarm unit 140 generate a fall alarm or a collision alarm in the form of light or sound when a situation in which the robot falls or collides with an obstacle is predicted by the mobile controller 150.

The navigation receiver 160 is mounted or provided by being supported by the robot frame 170. The navigation receiver 160 receives IGPS signals from the above-described plurality of navigation transmitters, obtains the three-dimensional coordinates of a position corresponding to the time point of the reception, and periodically transmits the coordinates to the mobile controller 150. Here, the method of recognizing (detecting) and determining the relative coordinate values (position) from the navigation transmitter 20, as described above, is used as the method of obtaining the three-dimensional coordinates of the navigation receiver 160.

The robot frame 170 is a body or a chassis for supporting or installing all structures to be mounted on the mobile unit 100, and is formed of lightweight material, such as aluminum profile, but has strong durability.

The drive mechanism 180 is provided below the robot frame 170. The drive mechanism 180 includes an attitude control sensor 191, a plurality of omnidirectional obstacle recognizing sensors 192, and a distance measuring sensor 193. Preferably, the drive mechanism 180 further includes an external encoder for measuring total traveling speed, a load cell, and a potentiometer.

Here, the attitude control sensor 191 is used to control the travel or attitude using any of a well-known gyroscope, an accelerometer, a tilt sensor, an approach sensor, or a combination thereof.

The omnidirectional obstacle recognizing sensors 192 are used to determine whether external objects or obstacles are coming close during the travel (motion).

The distance measuring sensor 193 is used to measure the distance from an attachment surface (for example, a ceiling surface or a vertical surface), such as the surface of a cargo hold, and predict that the mobile unit 100 is falling.

The external encoder for measuring total traveling speed feeds back the total traveling speed of the robot to a central processing unit through a sensor signal processor.

The load cell or the potentiometer is mounted on a steering system, and is used to detect the magnitude of attachment force and input the detected magnitude of the attachment force to the central processing unit through the sensor signal processor.

A plurality of encoders (an external encoder and a motor encoder), including the attitude control sensor 191, the omnidirectional obstacle-recognizing sensors 192 and the distance measuring sensor 193, the load cell, and the potentiometer are used to detect operational state information for realizing the functions of controlling the attitude of a robot, providing an alert related to a fall, attributable to the deficiency of attachment (or vacuum) to a ceiling surface or a vertical surface, recognizing an obstacle, avoiding a collision with a obstacle, and providing an alert related to the collision with the obstacle.

The mobile controller 150 of FIG. 5 and the drive mechanism 180 of FIG. 6 will be described in detail below.

The mobile controller 150 is provided in a robot, recognizes (determines) its own position using the IGPS signals, and enables the robot to autonomously travel to a target position.

As shown in FIG. 5, the mobile controller 150 includes a central processing unit 151, an input/output unit 152, a motion control unit 153, a drive control unit 154, a navigation control unit 155, a sensor signal processing unit 156, an emergency processing unit 157, an alarm generator 158, memory 159a, and a module connection unit 159b in an electronic circuit manner. In this embodiment, these units will be divided according to the function and role thereof, and will then be described.

The central processing unit 151 performs functions involved in the operation and control of all elements mounted on the robot according to the present invention. The central processing unit 151 uses a main board (for example, a Pulse-Code Modulation (PCM)-9577 board from Advantech Technologies, Inc.), which is small and supplies almost all computer control interfaces and is thus appropriate for robot engineering. The central processing unit 151 includes standard interfaces for a Video Graphics Array (VGA), a wired/wireless Local Area Network (LAN), a serial port, small-sized flash memory, a Universal Serial Bus (USB), a Hard Disk Drive (HDD), a Floppy Disk Drive (FDD), and the performance of various types of input/output, control, processing, and a generation function. Further, the central processing unit 151 is capable of being connected to a keyboard and a mouse.

The input/output unit 152 includes a digital input/output module and an analog input/output module.

When the central processing unit 151 transmits digital signals to the outside, the digital input/output module has a function of receiving instructions from the central processing unit 151 and outputting the instructions to the outside through a PC104 bus. Further, when the central processing unit 151 receives digital signals from the outside, the digital input/output module has a function of receiving the digital signals from the outside and transmitting the digital signals to the central processing unit 151 through the PC104 bus.

In the same way, when the central processing unit 151 transmits analog signals to the outside, the analog input/output module has a function of receiving the instructions of the central processing unit 151 and outputting the instructions to the outside through the PC104 bus. Further, when the central processing unit 151 receives analog signals from the outside, the analog input/output module has a function of receiving the analog signals from the outside and transmitting the analog signals to the central processing unit 151 through the PC104 bus.

The motion control unit 153 receives instructions, transmitted from the central processing unit 151 through the input/output unit 152, from an application program for performing the traveling motion of the wall climbing robot, analyzes and recognizes the instructions, and generates and outputs respective motor control signals for a first drive motor for steering the robot and a second drive motor for generating driving force. The motion control unit 153 occupies a small space and can prevent vibration using a PC104 bus structure, which is widely employed for an industrial central processing system.

Here, the instructions of the application program for performing the traveling motion of the wall climbing robot are transmitted to the main chip of the motion control unit 153, that is, a Field Programmable Gate Array (FPGA), which is one type of programmable logic chip, through the PC104 bus.

The FPGA transmits the motor control signals to the drive control unit 154. Further, the motion control unit 153 receives motor encoder signals, fed back from the first and second drive motors, and recognizes the operational state of the first and second drive motors.

The drive control unit 154 receives motor control signals output from the motion control unit 153, amplifies current, and generates motor output signals capable of actually driving the corresponding first and second drive motors of the drive mechanism, which will be described later.

The motor output signals of the drive control unit 154 may be defined so as to be matched with any one of a motor control algorithm for a differential steering method used for conditions, such as off-road travel or high-speed travel, and a motor control algorithm for a holonomic control method of realizing omnidirectional drive.

The navigation control unit 155 obtains coordinate values of the current position of the robot, as in a kind of localization, based on IGPS signals received by the navigation receiver 160 according to navigation execution commands input from the central processing unit 151, and recognizes and determines the current position of the robot by comparing the coordinate values with digital map information transmitted from the central host computer.

The navigation control unit 155 plans paths for performing autonomous traveling or motion from the determined current position to a target position, or resets the paths so as to perform an operation of avoiding an obstacle.

The sensor signal processing unit 156 can receive corresponding detection signals from the attitude control sensor 191, which corresponds to any one of a gyroscope, an accelerometer, a tilt sensor, and an proximity sensor, the omnidirectional obstacle-recognizing sensors 192, the distance measuring sensor 193, the external encoder for measuring total traveling speed, the motor encoder, the load cell, and the potentiometer.

The sensor signal processing unit 156 converts the signals detected by the respective sensors into an internal digital signal form that the central processing unit 151 can recognize, and inputs the resulting signals to the central processing unit 151.

The emergency processing unit 157 includes a specific artificial intelligent algorithm for recognizing obstacles or predicting that the robot will fall by comparing the detection signals of the respective sensors 191, 192, and 193 with preliminarily determined indexes and checking the comparison results in real time, in association with the central processing unit 151 and the sensor signal processing unit 156.

That is, the emergency processing unit 157 compares the detection signal of the attitude control sensor 191 with an attitude reference index, and checks the results of the comparison, and determines the attitude of the robot, thereby determining whether the robot is stable or unstable.

Further, the emergency processing unit 157 compares the detection signal of the omnidirectional obstacle recognizing sensors 192 with an obstacle reference index, and checks the results of the comparison, thereby determining whether external objects or obstacles are coming close during travel (motion).

Furthermore, the emergency processing unit 157 compares a detection signal, detected by the distance measuring sensor 193, with a falling reference index, and checks the comparison result, thereby predicting that the robot will fall.

Such determination results of the emergency processing unit 157 are transmitted to the alarm generator 158.

The alarm generator 158 selectively applies or cuts off operational power in response to an alarm control signal (on/off signal) based on the determination results of the emergency processing unit 157, so that the light-emitting alarm unit or the alerting alarm unit generates a fall alarm or collision alarm using light or sound.

The memory 159a is used to record and store the digital map information transmitted from the central host computer. Further, the memory 159a stores a predetermined operating system (for example, a Linux-based operating system), necessary for the overall operation of the robot according to the present invention, in a Random Access Memory (RAM) disk manner.

The module connection unit 159b includes a well-known multichannel (Multiple Input Multiple Output (MIMO)) module connection interface for connecting the marking module, the stud bolt welding module, the grinder module, and the depth measuring module, which will be described later, to the mobile controller 150.

As shown in FIG. 6, the drive mechanism 180 includes omnidirectional wheels.

For example, the wheel structure of the drive mechanism 180 employed in the present invention is a tricycle, that is, the drive mechanism 180 includes first, second, and third drive wheel assemblies 181, 182, and 183.

In the first, second, and third drive wheel assemblies 181, 182, and 183, a plurality of electromagnets is attached to the surface of a magnetic wheel 189, and the electromagnetic force is supplied to the electromagnets through rotational contact electrodes (not shown) for supplying power, so that attachment force can be generated on the flat portion of the membrane of the cargo hold by the electromagnetic force.

Here, the first drive wheel assembly 181 is provided for steering, and the remaining two drive wheel assemblies 182 and 183 may be manufactured to have a simple trailing wheel structure.

For example, the first drive wheel assembly 181 includes a first drive motor 184 for steering the robot and a second drive motor 185 for generating driving force.

The pinion gear of the first drive motor 184 for steering is coupled to the rack gear of the circumference edge of the steering turntable 186. The first drive motor 184 rotates (steers) the steering turntable 186 and other objects combined therewith or related thereto in response to the motor output signal of the drive control unit.

Here, the housing of the second drive motor 185 is mounted on the steering turntable 186. The output rotating shaft of the deceleration gear of the second drive motor 185 rotatably passes through the steering turntable 186 toward a location below the steering turntable 186.

Below the steering turntable 186, a first intersecting shaft gear 187, coupled to the output rotating shaft of the second drive motor 185, is coupled to a second intersecting shaft gear 188 coupled to the first intersecting shaft gear 187.

The shaft assembly of the second intersecting shaft gear 188 is combined to rotate the magnetic wheel 189 in the state of being supported by a suspension structure extending from the steering turntable 186.

The second drive motor 185 generates turning force so as to provide the driving force of the magnetic wheel 189. The first drive motor 184 generates turning force so as to provide the steering of the first drive wheel assembly 181.

Further, the second and third drive wheel assemblies 182 and 183 may be manufactured to realize steering and the generation of driving force in the same manner as the above-described first drive wheel assembly 181.

In this case, the operational state of each of motors is detected using an encoder corresponding to each of the plurality of drive motors (not shown) provided in the second and third drive wheel assemblies 182 and 183, in addition to the first and second drive motors 184 and 185 of the first drive wheel assembly 181, and omnidirectional control, which is generally performed to control a robot, is performed using a detected signal. The omnidirectional control may be implemented using a well-known method, and thus a description thereof will be omitted in the present invention.

Further, according to the present invention, the above-described magnetic wheel 189 may be replaced by a vacuum wheel.

FIG. 7 is a block diagram showing the marking module 300 to be coupled to the mobile unit 100 of the wall climbing robot using an indoor global positioning system according to the present invention.

The marking module 300 shown in FIG. 7 is coupled to the first installation position of the mobile unit 100, which corresponds to any of the side and upper portions of the robot frame 170 and the bottom portion of the drive mechanism 180.

As the installation position of the mobile unit 100 selectively changes, the structure of supplying power between the rotation motor and the turntable, which will be described later, may be a bevel gear structure, a worm and wormwheel gear structure, a pulley and belt structure, a direct rotational shaft-motor coupling structure, or a structure in which a motor is connected to a rotational shaft via a reduction gear in the present invention.

The marking module 300 performs all marking operations, such as drawing lines or marking dots on the bottom, ceiling, and vertical surfaces of a cargo hold or tank.

For this purpose, the marking module 300 includes a rotation motor 310 electrically connected to a marking controller (not shown) provided in the above-described mobile controller 150, and coupled to the installation position of the mobile unit 100 using a housing bracket; a turntable 320 coupled to receive the turning force of the rotation motor 310; a marking pen-carrying linear driver 330 provided below the turntable 320 and configured to generate moving force; a robot finger-type marking pen holder 340 configured to move by receiving the reciprocating feed force of the linear driver 330; a marking pen 350 mounted on the marking pen holder 340; and a marking pen changer 360 configured to detach/attach a plurality of marking pens 350 from/to the marking pen holder 340 based on the kind thereof.

Here, a well-known device, such as a ball screw structure or a linear actuator, is used as means for generating moving force in the marking pen-carrying linear driver 330.

Further, the marking pen-carrying linear driver 330 has any one of liner, curved, circular, and rectangular arrangement structures based on the structural characteristics thereof.

The marking pen-carrying linear driver 330 is connected to the marking controller (not shown) so as to mutually transmit control signals and feedback signals for checking the operation thereof.

The marking controller is a well-known electronic circuit controller realized using a technique of planning and controlling paths formed by lines, circles, and dots, and is provided around the mobile controller 150.

The marking pen-carrying linear driver 330 is connected to the mobile controller 150 through the marking controller and the module connection unit 159b illustrated in FIG. 5, and is configured to associate the traveling motion with the marking operation of the robot.

Further, the marking controller is connected to a marking control driver provided in the operating system of the central processing unit of the mobile controller 150 using software, and is configured to perform a marking operation based on the instructions of an application program for a series of marking operations.

FIG. 8 is a block diagram showing the stud bolt welding module 400 and the grinder module 500, which are coupled to the mobile unit 100 of the wall climbing robot using an indoor global positioning system according to the present invention.

The stud bolt welding module 400 shown in FIG. 8 has the same construction as the well-known auto-carriage type welding device.

That is, the stud bolt welding module 400 is coupled to the second installation position of the mobile unit 100, which corresponds to any of the side and upper portions of the robot frame 170, the top portion of the mobile controller 150, and the bottom portion of the drive mechanism 180. Further, as in a general multiple shaft linear robot, the stud bolt welding module 400 may further include a multiple shaft mobile structure, which enables a swing operation, a tilt operation and an elevating operation using a plurality of ball screws and welding motors so as to realize multiple shaft motion, using a well-known method.

The stud bolt welding module 400 includes a welding gun 430 on the end of the arm of the well-known multiple shaft mobile structure.

The stud bolt welding module 400 further includes a welding/feeder controller (not shown) for performing motor control for rotating the ball screw thereof, operation control for welding, and stud bolt supply control.

A welding/feeder control driver is further provided in the operating system of the central processing unit of the mobile controller 150 using software.

Therefore, the welding/feeder controller is physically connected to the mobile controller 150 through the module connection unit 159b shown in FIG. 5, and is recognized in the mobile controller 150 through the welding/feeder control driver using software. According to such a connection and reorganization relationship, the stud bolt welding module 400 can associate the welding operation with the grinder operation, which will be described later, while the mobile unit 100 performs the traveling motion.

Meanwhile, a stud bolt feeder 450 is provided in a portion which is placed beside the stud bolt welding module 400 and below the robot frame 170. The operation of the stud bolt feeder 450 is controlled by the above-described welding/feeder controller.

The stud bolt feeder 450 is a kind of stud bolt supply device or loading device. The stud bolt feeder 450 separately supplies stud bolts toward the welding gun 430 such that the stud bolt welding module 400 welds the supplied stud bolts to the task position of a room (for example, a cargo hold).

For this purpose, as in the well-known method, the stud bolt feeder 450 may include a bolt cartridge loaded with a plurality of stud bolts; a gripper feeding robot for carrying the stud bolts from the bolt cartridge to a task position; and a stud bolt loader provided on one end of the gripper feeding robot and formed so as not to obstruct the welding direction of the welding gun 430.

Here, the working position is determined based on data instructed (transmitted) by the central host computer.

Further, other methods of inputting a working position may include 1) a method of an operator directly inputting coordinate values; and 2) a method of a stud bolt attachment robot inputting coordinate values.

1) Method of Operator Directly Inputting Coordinate Values

An operator has a terminal for performing a coordinate input operation, which has the same technical spirit as the above-described navigation receiver and has personal Digital Assistant (PDA) functions capable of communicating with the central host computer.

Therefore, the operator manually attaches a stud bolt to the predetermined position of a cargo hold. Thereafter, the operator places the terminal for performing a coordinate input operation above the stud bolt. When a coordinate input button is pressed through a Graphic User Interface (GUI) realized in the terminal, the IGPS signals of the navigation receiver is received, so that the coordinate values of the position where the stud bolt is attached are automatically transmitted to the central host computer. Here, the coordinate values of the position where the stud bolt is attached are the target position of the above-described robot according to the present invention.

Therefore, the above-described mobile unit 100 moves from its current position to the position where the stud bolt is attached, that is, the target position. Thereafter, the stud bolt welding module 400 provided in the mobile unit 100 performs welding on the contact between the stud bolt and the cargo hold.

2) Method of a Stud Bolt Attachment Robot Inputting Coordinate Values

The stud bolt attachment robot is loaded with a plurality of stud bolts in the form of a cartridge, and can autonomously move inside the cargo hold using a wheel structure which is the same as that of the above-described mobile unit. Each of the stud bolts loaded in the form of a cartridge in the stud bolt attachment robot is provided with adhesive tape on the head thereof in advance so as to be separately attached on the cargo hold.

Whenever the stud bolt attachment robot separately attaches the stud bolts on the cargo hold, the stud bolt attachment robot recognizes and determines coordinate values corresponding to the attachment position using the IGPS signals of the above-described navigation receiver, and transmits the determined coordinate values to the central host computer.

Finally, the mobile unit 100 moves from its current position to the position where the stud bolt in present, that is, the target position, and the stud bolt welding module 400, mounted on the mobile unit 100, performs welding.

Meanwhile, the grinder module 500 is coupled around the stud bolt welding module 400 or is coupled to the third installation position, which is loaded before the stud bolt welding module 400.

The grinder module 500 is a module for performing a preliminary grinding operation with respect to a stud bolt welding position. Of course, the grinder module 500 may be used to remove the weld beads of a weld line formed by the stud bolt welding module 400.

The grinder module 500 is connected to the mobile controller 150 through the grinder controller (not shown) and a module connection unit in the same way as the above-described marking module or the stud bolt welding module 400. The grinder module 500 generates turning force for performing preliminary grinding with respect to the stud bolt welding module 400, and is electrically connected to the mobile controller 150 so as to perform automation works using the mobile controller 150 according to the present invention or using general robot control technology, thereby receiving power for a grinding motor of the grinder module 500 and operating.

FIG. 9 is a block diagram showing the depth measuring module 600 which is coupled to the multifunctional wall climbing robot according to the present invention using the indoor global positioning system.

As shown in FIG. 9, the depth measuring module 600 is coupled to the fourth installation position of the mobile unit 100, which corresponds to any of the side and upper portions of the robot frame 170 and the bottom portion of the drive mechanism 180.

The depth measuring module 600 includes a measurement unit 610 configured to support any distance measurement method selected from among a stroke motion method, a laser method, and an ultrasonic method, in the same way as the above-described marking module, stud bolt welding module, and grinder module; and a depth measurement controller 620 mounted in the measurement unit 610 and configured to perform the operation of measuring depth. The depth measurement controller 620 is connected to the mobile controller 150 through the module connection unit.

The depth measuring module 600 also performs automation works using the mobile controller 150 according to the present invention or according to general robot control technology. That is, the depth measurement controller of the depth measuring module 600 is connected to a depth measurement control driver provided in the operating system of the central processing unit of the mobile controller 150 using software, and is configured to perform the depth measurement operation based on the instructions of an application program for a series of depth measurement operations while the robot is traveling or stopped.

Here, the depth measurement operation is the operation in which the depth measuring module 600 determines a reference point of a flat portion and measures relative depth based on the reference point.

In addition, as shown in FIG. 10, a plurality of first clamp units 701, a plurality of second clamp units 702, and a plurality of fastening elements 703 are provided to the bottom of the drive mechanism 180 of a separate type mobile unit 100a so as to replace or mount the task modules 300, 400, 500, and 600.

For example, each of the first clamp units 701 is configured to have the shape of a coupling plate, and is coupled to each of the installation surfaces of the task modules 300, 400, 500, and 600. Each of the second clamp units 702 is configured to have a shape capable of fastening the first clamp unit 701, and is fastened to the bottom of the drive mechanism 180. Each of the fastening elements 703 is configured to have the shape of well-known locking/unlocking equipment, and is coupled to the side of the first and second clamp units 701 and 702 so as to attach/detach the first and second clamp units 701 and 702.

The separate type mobile unit 100a has an advantage in that the task modules 300, 400, 500, and 600 can be individually selected if necessary.

In a similar way, as shown in FIG. 11, a combination type mobile unit 100b, which has a different type of layout, includes a plurality of first clamp units 701, a plurality of second clamp units 702b, and a plurality of fastening elements 703 on the bottom of a drive mechanism 180b so as to simultaneously mount the task modules 300, 400, 500, and 600, so that there is an advantage in that multitasking is possible.

Although the present invention has been described with reference to the preferred embodiments of the present invention, this is provided for illustrative purpose, and those skilled in the art can understand that various modifications and other equivalent embodiments are possible. Accordingly, the range of technical protection of the present invention should be determined based on the technical spirit of the accompanying claims.

The invention claimed is:

1. A wall climbing robot using an indoor global positioning system (IGPS) provided in a room, comprising:
   a navigation receiver configured to receive rotating fan beams emitted from one or more navigation transmitters of the indoor global positioning system, and recognize the rotating fan beams as IGPS signals;
   a robot frame to which the navigation receiver is mounted;
   a mobile controller installed on the robot frame, the mobile controller recognizing and determining its own position by using the IGPS signals;
   a drive mechanism configured to travel along surfaces of the room under control of the mobile controller;
   a stud bolt welding module coupled to a mobile unit in which the mobile controller is installed, and configured to perform an operation of welding a stud bolt; and
   a grinder module coupled to the mobile unit at an installation position where a preliminary grinding operation is performed with respect to the stud bolt welding module.

2. The wall climbing robot according to claim 1, further comprising a second communication unit provided to the robot frame, the second communication unit supporting a wired or wireless data communication interface so as to perform communication with a first communication unit of a central host computer to receive digital map information from the central host computer.

3. The wall climbing robot according to claim 1, further comprising a light-emitting alarm unit and an alerting alarm unit provided to the robot frame, which respectively generate a fall alarm or a collision alarm when a situation in which the robot falls or collides with an obstacle is predicted by the mobile controller.

4. The wall climbing robot according to claim 1, wherein the mobile controller comprises:
   a central processing unit for operating and controlling all elements mounted on the robot;
   an input/output unit for inputting/outputting digital or analog signals transmitted/received to/from the central processing unit;
   a motion control unit for receiving instructions, transmitted from the central processing unit through the input/output unit, of an application program for performing traveling motion of the wall climbing robot, and generating motor control signals for a drive motor of the drive mechanism;
   a drive control unit for receiving the motor control signals output from the motion control unit, amplifying current, and generating motor output signals capable of actually driving the drive motor of the drive mechanism;
   a navigation control unit for obtaining coordinate values of a current position of the robot based on the IGPS signals received by the navigation receiver according to navigation execution commands input from the central processing unit, recognizing and determining the current position of the robot by comparing the coordinate values with digital map information transmitted from a central host computer, and planning paths for performing autonomous traveling from the current position to a target position; and
   a sensor signal processor for converting detection signals, detected by a plurality of sensors installed on the drive mechanism, into an internal digital signal form capable of being recognized by the central processing unit, and inputting the resulting signals to the central processing unit.

5. The wall climbing robot according to claim 4, further comprising:
- an emergency processing unit for comparing each of detection signals detected from the plurality of sensors provided on the drive mechanism with any of an attitude reference index, an obstacle reference index, and a falling reference index, checking results of the comparison, and outputting determination results, such as recognition of an obstacle and prediction of falling of the robot;
- an alarm generator for controlling generation of a fall alarm or a collision alarm of a light-emitting alarm unit or an alerting alarm unit according to the results of the determination of the emergency processing unit; and
- memory for recording and storing digital map information, transmitted from the central host computer, and storing an operating system.

6. The wall climbing robot according to claim 1, further comprising a marking module coupled to a mobile unit in which the mobile controller is installed, and configured to perform a marking operation.

7. The wall climbing robot according to claim 1, further comprising a depth measuring module coupled to a mobile unit in which the mobile controller is installed, and configured to perform a depth measurement operation.

8. The wall climbing robot according to claim 1, wherein a plurality of first and second clamp units and a plurality of fastening elements are provided to a bottom of the drive mechanism so as to replace or simultaneously mount task modules.

9. A wall climbing robot using an indoor global positioning system (IGPS) provided in a room, comprising:
- a navigation receiver configured to receive rotating fan beams emitted from one or more navigation transmitters of the indoor global positioning system, and recognize the rotating fan beams as IGPS signals;
- a robot frame to which the navigation receiver is mounted;
- a mobile controller installed on the robot frame, the mobile controller recognizing and determining its own position by using the IGPS signals;
- a drive mechanism configured to travel along surfaces of the room under control of the mobile controller,
  - wherein a plurality of first and second clamp units and a plurality of fastening elements are provided to a bottom of the drive mechanism so as to replace or simultaneously mount task modules.

10. The wall climbing robot according to claim 9, further comprising a second communication unit provided to the robot frame, the second communication unit supporting a wired or wireless data communication interface so as to perform communication with a first communication unit of a central host computer to receive digital map information from the central host computer.

11. The wall climbing robot according to claim 9, further comprising a light-emitting alarm unit and an alerting alarm unit provided to the robot frame, which respectively generate a fall alarm or a collision alarm when a situation in which the robot falls or collides with an obstacle is predicted by the mobile controller.

12. The wall climbing robot according to claim 9, wherein the mobile controller comprises:
- a central processing unit for operating and controlling all elements mounted on the robot;
- an input/output unit for inputting/outputting digital or analog signals transmitted/received to/from the central processing unit;
- a motion control unit for receiving instructions, transmitted from the central processing unit through the input/output unit, of an application program for performing traveling motion of the wall climbing robot, and generating motor control signals for a drive motor of the drive mechanism;
- a drive control unit for receiving the motor control signals output from the motion control unit, amplifying current, and generating motor output signals capable of actually driving the drive motor of the drive mechanism;
- a navigation control unit for obtaining coordinate values of a current position of the robot based on the IGPS signals received by the navigation receiver according to navigation execution commands input from the central processing unit, recognizing and determining the current position of the robot by comparing the coordinate values with digital map information transmitted from a central host computer, and planning paths for performing autonomous traveling from the current position to a target position; and
- a sensor signal processor for converting detection signals, detected by a plurality of sensors installed on the drive mechanism, into an internal digital signal form capable of being recognized by the central processing unit, and inputting the resulting signals to the central processing unit.

13. The wall climbing robot according to claim 12, further comprising:
- an emergency processing unit for comparing each of detection signals detected from the plurality of sensors provided on the drive mechanism with any of an attitude reference index, an obstacle reference index, and a falling reference index, checking results of the comparison, and outputting determination results, such as recognition of an obstacle and prediction of falling of the robot;
- an alarm generator for controlling generation of a fall alarm or a collision alarm of a light-emitting alarm unit or an alerting alarm unit according to the results of the determination of the emergency processing unit; and
- memory for recording and storing digital map information, transmitted from the central host computer, and storing an operating system.

14. The wall climbing robot according to claim 9, further comprising a marking module coupled to a mobile unit in which the mobile controller is installed, and configured to perform a marking operation.

15. The wall climbing robot according to claim 9, further comprising a stud bolt welding module coupled to a mobile unit in which the mobile controller is installed, and configured to perform an operation of welding a stud bolt.

16. The wall climbing robot according to claim 9, further comprising a depth measuring module coupled to a mobile unit in which the mobile controller is installed, and configured to perform a depth measurement operation.

* * * * *